(12) United States Patent
Folger (10) Patent No.: US 12,151,435 B2
(45) Date of Patent: Nov. 26, 2024

(54) METHOD FOR TREATING THE SURFACE OF SHAPED PARTS

(71) Applicant: DyeMansion GmbH, Planegg (DE)

(72) Inventor: Alena Folger, Kottgeisering (DE)

(73) Assignee: DyeMansion GmbH, Planegg (DE)

( * ) Notice: Subject to any disclaimer, the term of this patent is extended or adjusted under 35 U.S.C. 154(b) by 177 days.

(21) Appl. No.: 17/893,627

(22) Filed: Aug. 23, 2022

(65) Prior Publication Data

US 2022/0396030 A1   Dec. 15, 2022

Related U.S. Application Data

(63) Continuation of application No. PCT/EP2021/054985, filed on Mar. 1, 2021.

(30) Foreign Application Priority Data

Feb. 27, 2020  (DE) ........................ 10 2020 15 232.4

(51) Int. Cl.
*B29C 71/02* (2006.01)
*B29C 64/10* (2017.01)
(Continued)

(52) U.S. Cl.
CPC .......... *B29C 64/314* (2017.08); *B29C 64/153* (2017.08); *B29C 71/0009* (2013.01);
(Continued)

(58) Field of Classification Search
CPC ........ B29C 71/0009; B29C 2071/0045; B29C 71/02; B29C 64/10; C08J 7/00; C08J 7/12; D06P 1/36; D06P 1/39; D06P 1/44; D06P 1/90; D06P 1/928; D06P 3/001; D06P 3/005; D06P 3/241; D06P 3/245;
(Continued)

(56) References Cited

U.S. PATENT DOCUMENTS 2,921,828 A * 1/1960 Caldwell ................. D06P 3/521
528/492 X
3,738,803 A * 6/1973 Blanc et al. .............. D06P 1/90
8/612

(Continued)

FOREIGN PATENT DOCUMENTS

CN   110453512 A  * 11/2019  ................ D06P 1/39
DE        2758313 A1       7/1978
(Continued)

OTHER PUBLICATIONS

Translation of CN 110453512 A (published on Nov. 15, 2019).*
(Continued)

*Primary Examiner* — Leo B Tentoni
(74) *Attorney, Agent, or Firm* — Myers Wolin, LLC (57) ABSTRACT

A method is provided for treating the surface of a shaped melded part produced with a plastic having ester, ketone and/or ether bonds. The plastic is selected from the group including a polymer, copolymer, polymer blend and combinations of the same. The method includes a pretreatment step for cationically modifying the surface of the melded shaped part. The cationic modification is carried out with a reactant dissolved in a solvent and having one or more amine, imine and/or amide groups.

31 Claims, 2 Drawing Sheets

(51) Int. Cl.

| | | |
|---|---|---|
| *B29C 64/153* | (2017.01) | |
| *B29C 64/314* | (2017.01) | |
| *B29C 71/00* | (2006.01) | |
| *B33Y 10/00* | (2015.01) | |
| *B33Y 40/00* | (2020.01) | |
| *B33Y 40/10* | (2020.01) | |
| *B33Y 70/00* | (2020.01) | |
| *B33Y 80/00* | (2015.01) | |
| *C08J 7/00* | (2006.01) | |
| *C08J 7/12* | (2006.01) | |
| *D06P 1/36* | (2006.01) | |
| *D06P 1/39* | (2006.01) | |
| *D06P 1/44* | (2006.01) | |
| *D06P 1/90* | (2006.01) | |
| *D06P 1/92* | (2006.01) | |
| *D06P 3/00* | (2006.01) | |
| *D06P 3/24* | (2006.01) | |
| *D06P 3/52* | (2006.01) | |
| *D06P 5/00* | (2006.01) | |

(52) U.S. Cl.
CPC ............... *B33Y 10/00* (2014.12); *B33Y 40/00* (2014.12); *B33Y 70/00* (2014.12); *B33Y 80/00* (2014.12); *D06P 1/928* (2013.01); *D06P 3/001* (2013.01); *D06P 3/005* (2013.01); *D06P 3/241* (2013.01); *D06P 3/245* (2013.01); *D06P 3/521* (2013.01); *D06P 3/525* (2013.01); *D06P 5/002* (2013.01); *B29C 2071/0045* (2013.01)

(58) Field of Classification Search
CPC .......... D06P 3/521; D06P 3/525; D06P 5/002; D06P 5/20; D06P 5/22; B33Y 10/00; B33Y 40/10

USPC ......... 264/78, 232, 233, 234, 237, 340, 345, 264/348, 308, 401, 497; 8/506, 509, 512, 8/515, 638, 658, 675, 685, 930; 528/491, 528/492, 495, 496

See application file for complete search history.

(56) References Cited

U.S. PATENT DOCUMENTS

| 3,775,055 | A | * | 11/1973 | Wedler | ............... D06B 21/00 |
| | | | | | 8/155.1 |
| 3,932,126 | A | | 1/1976 | Jilla | |
| 4,030,880 | A | * | 6/1977 | Holfeld | ............... D06P 3/241 |
| | | | | | 264/78 X |
| 5,028,660 | A | * | 7/1991 | Kobashi | ............... D06P 3/521 |
| | | | | | 8/509 X |
| 2019/0275516 | A1 | * | 9/2019 | Lowe, Jr. | ............ B81C 1/00206 |

FOREIGN PATENT DOCUMENTS

| DE | 102014102137 A1 | 8/2015 |
| WO | 2017/210286 A1 | 12/2017 |

OTHER PUBLICATIONS

International Search Report issued by the European Patent Office for International Patent Application No. PCT/EP2021/054985, mailed on May 27, 2021.

* cited by examiner

METHOD FOR TREATING THE SURFACE OF SHAPED PARTS

CROSS REFERENCE TO RELATED APPLICATIONS

This application is a continuation of International Application No. PCT/EP2021/054985, filed Mar. 1, 2021, which claims priority to German Patent Application No. 10 2020 105 232.4, filed Feb. 27, 2020, the contents of each of which are incorporated by reference herein.

FIELD OF THE INVENTION

The invention relates to a method for treating the surface of shaped parts made from a plastic. In particular, the invention relates to a method for dyeing shaped parts made from a plastic which are or have been produced in a 3D printing process, the plastic having in particular ester, ketone and/or ether bonds.

BACKGROUND

It is known to produce shaped parts from a polymer using a 3D printing process. However, polymers as starting materials for 3D printing are usually available only in a limited number of colors, which considerably limits the possibilities for 3D printing shaped parts in different colors. It is therefore usually necessary to dye the shaped parts after printing.

A large number of polymers that can be used as a starting material for 3D printing are formed by linking acids/alcohols with alcohols. Other polymers can be obtained by acylation. The resulting ester, ketone or ether bonds have a neutral to slightly acidic character and can therefore be dyed only insufficiently or not at all with acid dyes and metal complex dyes.

However, the use of acid dyes and metal complex dyes is desirable because they allow the widest possible range of colors when dyeing the 3D printed shaped parts, while other dyes, such as cationic dyes and vat dyes, can achieve only a limited range of color nuances, and the shades tend to be relatively dull and not as bright as acid or metal complex dyes.

In addition, it is desirable for the dyed shaped parts to have good wash fastness and low dye migration.

There is therefore the problem that 3D printed shaped parts made from polymers, in particular polymers that have no cationic binding sites, cannot be subsequently dyed or can be dyed only insufficiently with regard to color brightness and color fastness. In this context, cationic binding sites are to be understood as meaning functional groups to which anionic functional groups can bind under suitable conditions, e.g. in acidic (ionic) conditions.

However, in most 3D printing processes the shaped parts can only be dyed subsequently if a high-quality dyeing result is to be achieved.

The reasons for this lie in the 3D printing process itself and are primarily based on the fact that the input of laser or light energy and thermal energy can partially or completely destroy the dyes contained in or added to the polymer.

In addition, the dyes or color pigments added to the starting material for the 3D printing change the processability of the starting material during the printing process, and so the printing process requires complex adaptations for each color of the starting material. A particular problem here is that the added dyes and color pigments absorb some of the light or thermal energy and thereby seriously disrupt the printing process. The changing processability of the starting material has to be compensated for by adapting the printing process in order to ensure a reliable printing process that is the same for all colors. Extensive process optimization is required for this. Such adaptations are usually so complex and time-consuming that shaped parts made from a polymer can be printed directly in color using only a very limited range of colors.

In particular with dark colors, such as black, a very high amount of light energy is absorbed by the dyes or color pigments, and this makes the printing process uncontrollable, or even impossible, in many cases.

3D printing devices must therefore run on a single color and be set accordingly and thus cannot be used flexibly for multiple colors.

The mixing of a master batch for the starting material for the printing is also associated with a new development or adjustment of the printing process parameters.

DE 27 58 313 A1 discloses a method for dyeing polyester yarns. In this method, a reaction product is first produced from an alkylating agent and an ammonium compound. The polyester yarns are then coated with this reaction product, i.e. the polyester yarns are coated with the reaction product, which is said to bring about improved ink absorption. A direct reaction between the ammonium compound and the polyester yarn does not take place here. The disadvantage of this is that an additional step is necessary for dyeing the polyester yarns, namely the production of the reaction product including coating the polyester yarns with this reaction product, which in any case makes the entire dyeing process more time-consuming.

SUMMARY

The present disclosure therefore relates to providing solutions which allow shaped parts made from a plastic to be dyed, in particular shaped parts made from a plastic which are or have been produced using a 3D printing process, and with which the above-mentioned disadvantages can be at least partially avoided.

This problem may be solved using the methods described herein.

Accordingly, a method is provided for treating the surface of a shaped part produced with a plastic having ester, ketone and/or ether bonds, the plastic being selected from the group comprising a polymer, copolymer, polymer blend and combinations thereof, the method comprising a pretreatment step for cationically modifying the surface of the shaped part, wherein, in the pretreatment step, the shaped part is placed in a pretreatment solution for a predetermined pretreatment time, the pretreatment solution comprising at least:
 a first solvent and
 a reactant which is dissolved in the first solvent and has one or more amine, imine and/or amide groups.

In this context, cationic modification is to be understood as meaning the binding of functional groups.

It is advantageous here that the ammonium compounds dissolved in the pretreatment solution react directly with the surface of the polymeric shaped part (which is not the case with the above-mentioned prior art according to DE 27 58 313 A1) in order to functionalize the surface of the shaped part. Reaction products consisting of alkylating agent and ammonium compounds are not required here, as is known from the prior art. A dyeing process can thus be carried out significantly more quickly and efficiently, since the production of a reaction product and the coating of the shaped part with this reaction product are no longer necessary. In addition, the direct binding of the ammonium compound to the shaped part or to the material of the shaped part means that insufficient adhesion cannot occur, as would be possible when coating with a reaction product according to DE 27 58 313 A1. Furthermore, irregular material coverage may occur during coating, whereas, in a direct reaction between the shaped part and the ammonium compound according to the present disclosure, only monomolecular and thus very uniform coverage is achieved, resulting in significantly better dyeing of the shaped part.

The first solvent can comprise water.

It is advantageous if the reactant is a nucleophilic reactant, with the pretreatment solution having a nucleophilicity comparable to or higher than the esterified and/or etherified alcohol of the plastic or the ketone.

The pretreatment solution can be buffered to a predetermined pH value, the predetermined pH value preferably being between 7 and 14, more preferably between 9 and 12.

The pretreatment time can be between 1 minute and 300 minutes.

The pretreatment solution in the pretreatment step can have a temperature between 10° C. and 130° C.

It is advantageous if the pretreatment step is carried out above atmospheric pressure.

The surface treatment can include a dyeing step for dyeing the surface of the shaped part, the dyeing step being carried out after the pretreatment step.

The disclosure also provides a method for dyeing a shaped part produced with a plastic having ester, ketone and/or ether bonds, the plastic being selected from the group comprising a polymer, copolymer, polymer blend and combinations thereof, the method comprising
    a pretreatment step for cationically modifying the surface of the shaped part and
    a dyeing step, carried out after the pretreatment step, for dyeing the surface of the shaped part
wherein
    in the pretreatment step, the shaped part is placed in a pretreatment solution for a predetermined pretreatment time, the pretreatment solution comprising at least:
        a first solvent and
        a reactant which is dissolved in the first solvent and has one or more amine, imine and/or amide groups, and
    in the dyeing step, the shaped part is placed in a dyeing solution for a predetermined dyeing time, the dyeing solution comprising at least
        a second solvent and
        a dye dissolved in the second solvent.

The first solvent can comprise water.

It is advantageous here if the reactant is a nucleophilic reactant, with the pretreatment solution having a nucleophilicity comparable to or higher than the esterified and/or etherified alcohol of the plastic or the ketone.

The pretreatment solution can be buffered to a predetermined pH value, the predetermined pH value preferably being between 7 and 14, more preferably between 9 and 12.

It is advantageous if the pretreatment time is between 1 minute and 300 minutes.

The pretreatment solution in the pretreatment step can have a temperature between 10° C. and 130° C.

It is advantageous if the pretreatment step is carried out above atmospheric pressure.

It is also advantageous if the pretreatment solution contains 0.001 to 50 wt. % of the reactant.

The dye can be selected from the group comprising acid dye, metal complex dye, and mixtures thereof.

It is advantageous if the dyeing solution is buffered to a predetermined pH, the predetermined pH value preferably being between 2.5 and 7.

The dyeing solution can contain a leveling agent and/or a defoamer.

It is advantageous if the dyeing solution contains 0.0001 to 10 wt. %, preferably 0.0001 to 1 wt. % of the dye.

It can be advantageous if the dyeing step is carried out in a pressure-tight container.

In the dyeing step, the dyeing solution can be heated to a dyeing temperature between 30° C. and 180° C., preferably between 70° C. and 130° C.

The dyeing solution can be heated at a first heating rate to a first temperature and at a second heating rate from the first temperature to the dyeing temperature.

It is advantageous if the first heating rate is between 3° C./min and 9° C./min and/or the second heating rate is between 0.5° C./min and 3° C./min.

The first temperature be between 40° C. and 70° C.

The dyeing temperature can be kept largely constant for a period of between 5 minutes and 200 minutes.

The dyeing solution can subsequently be cooled to a temperature below 40° C., the cooling rate being below 5° C./min, preferably below 3° C./min.

In an advantageous embodiment of the method, the dyeing step can be carried out under positive pressure.

It is advantageous if the shaped part, after the pretreatment step and before the dyeing step,
    is cleaned, preferably with distilled water, and/or
    is dried.

In this case, the drying can be carried out above room temperature and/or under negative pressure.

The reactant can be selected from the group comprising
    ammonia
    amines, in particular hexamethylenediamine, aniline, phenylenediamine and diethylamine,
    imines,
    aminosilanes, in particular 3-aminopropyltriethoxysilane (APTES), 3-aminopropylmethyldiethoxysilane (APMDS) and 3-aminopropyldimethylethoxysilane (APDES),
    amides, in particular sodium amide and potassium amide,
    aminated alcohols, and
    combinations thereof.

The shaped part can be produced in a 3D printing process.

The 3D printing process is for example, but not exclusively, a powder-based process, for example the LS process (laser sintering) or MJF process (multi-jet fusion), a light-curing 3D printing process, such as a photopolymerization process, in particular a bath-based photopolymerization process (vat photopolymerization), such as the SLA process (stereolithography), DLP process (digital light processing), or CDLP process (continuous digital light processing, including the CLIP process (continuous liquid interface production) from Carbon Inc.), or a filament-based process (e.g. the FFF process (fused filament fabrication) or the FDM process (fused deposition molding)).

Other suitable 3D printing processes for producing shaped parts made from a plastic can also be used.

The method described herein accordingly comprises a pretreatment step in which the surface of the shaped part is cationically functionalized, with the functionalization penetrating into the material of the surface. "Cationically functionalize" is understood here to mean the binding of functional groups which are positively charged under certain pH values.

The method can also comprise a dyeing step in which the surface of the shaped part which has been pretreated is dyed with a dye, the dye penetrating into the material of the surface.

During the dyeing process in the dyeing step, the dye is introduced into the material of the surface, i.e. the dye penetrates into the surface of the shaped part such that, after the dyeing step, the material on the surface is dyed to a certain penetration depth.

The method according to the disclosure is also advantageous in that the color selection for the production of a colored shaped part in 3D printing is not limited to the colors of the starting material (plastic). Instead, all the colors of metal complex dyes and acid dyes and combinations thereof are available for dyeing a 3D printed shaped part made from a plastic. Various metal complex dyes and/or various acid dyes can be mixed in order to obtain a broad spectrum of colors with which a 3D printed shaped part made from a plastic can be dyed according to the method. The method is also characterized in that it can also be carried out for small batch quantities or individual pieces of a certain color.

The pretreatment step advantageously achieves an ionic bond between the dyes containing acid groups and the shaped part due to the cationic modification of the surface of the shaped part having ester, ketone and/or ether bonds. As a result, the dye is chemically bonded to the polymer chains and thus fixed much better to the surface of the shaped part. In addition, the migration barrier and the color fastness are significantly increased, as a result of which the mobility of the dye in the shaped part is reduced to such an extent that the dye is prevented from migrating to other materials that come into contact with the shaped part dyed according to the method.

The above heating rates and cooling rates reduce the thermal stress to which the shaped part is subjected and therefore ensure that the material properties are not changed, or at least not changed too much. Effects such as thermal distortion are minimized.

The method according to this disclosure is independent of the geometry of the shaped parts. This is because pretreatment in an immersion bath of pretreatment solution allows the pretreatment solution to reach even narrow cracks and internal structures of the shaped part. The same also applies to the dyeing in the dyeing step, i.e. when dyeing in an immersion bath of dyeing solution, the dyeing solution reaches even narrow cracks and internal structures of the shaped part. This means that even surfaces of the shaped part that are not accessible during painting, for example, can be dyed.

The shaped parts can also be processed as bulk material, i.e. they can simply be placed in a pretreatment tank or in a dyeing tank without additional measures. Hanging the shaped parts or individually pretreating or dyeing the shaped parts can be dispensed with.

In addition, the pretreatment solution can be reused, for example for pretreating further shaped parts to be dyed according to the method, so that the pretreatment solution does not necessarily have to be disposed of after pretreatment. This reduces the cost of pretreating and dyeing.

A shaped part within the meaning of the present invention is a part that preferably is or has been produced in a 3D printing process.

BRIEF DESCRIPTION OF THE DRAWING

Further details and features of the invention will become apparent from the following description in connection with the drawings, in which.

DETAILED DESCRIPTION OF THE PREFERRED EMBODIMENTS

The shaped part to be dyed is produced from a plastic in a 3D printing process, for example in a photopolymerization process, with the plastic having ester, ketone and/or ether bonds. The plastic is a polymer, copolymer, polymer blend, and combinations thereof.

For example, this can involve the following plastics or plastic classes: polyacrylates, e.g. polymethyl methacrylate (PMMA); polyethers, e.g. epoxy resins; polyetherketones (PEK), e.g. polyaryletherketones (PAEK), polyetheretherketones (PEEK), polyurethanes, e.g. thermoplastic polyurethane (TPU), polyetherimides (PEI); or polyesters, e.g. polylactides (PLA), polyethylene terephthalate (PET), polybutylene terephthalate (PBT). According to the invention, however, other suitable plastics can also be used.

Figure 1:
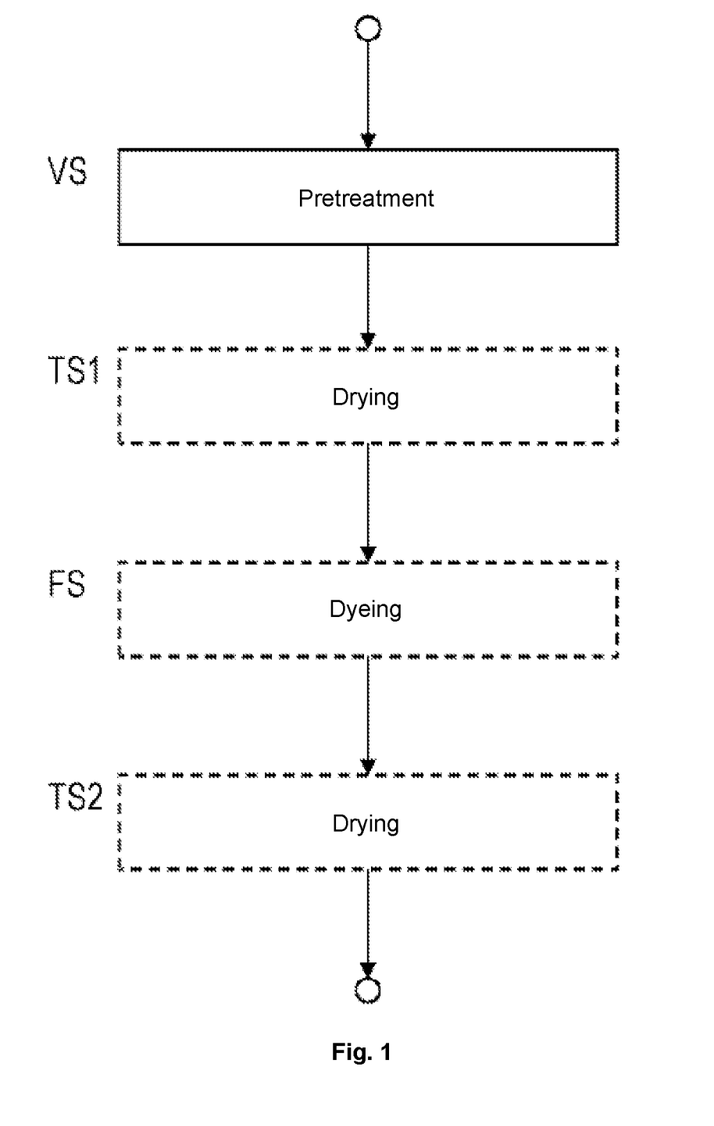
FIG. 1 is a flowchart to illustrate the method according to the invention.

FIG. 1 is a possible flowchart of a method according to the invention.

The method shown in FIG. 1 has four method steps, namely a pretreatment step VS, a dyeing step FS, a first drying step TS1 which is carried out between the pretreatment step VS and the dyeing step FS, and a second drying step TS2 which is carried out after the dyeing step FS. The two drying steps TS1, TS2 are optional and do not have to be carried out for the method according to the invention.

The dyeing step FS can also optionally be carried out, and so the invention also provides a method for surface treatment in which the surface of the shaped part is cationically modified. As a result, a shaped part produced with a plastic having ester, ketone and/or ether bonds can be provided and can be dyed with a dye if necessary, for example with an acid dye, metal complex dye or mixtures thereof.

If such a shaped part does have to be dyed, the shaped part is first pretreated in the pretreatment step VS and then dyed in the dyeing step.

The invention is described below on the basis of 3D printed parts that were produced or printed with a polymer. According to the invention, however, shaped parts can also be pretreated and dyed which are produced or printed with a copolymer, a polymer blend or combinations of polymers, copolymers and/or polymer blends in a 3D printing process.

Pretreatment Step

In the pretreatment step, the surface of the shaped part, which is produced from a polymer having ester, ketone and/or ether bonds, is cationically modified or functionalized.

In this case, the shaped part is placed in a pretreatment solution for a predetermined pretreatment time. The pretreatment solution comprises at least a first solvent and a reactant which is dissolved in the first solvent and has one or more amine, imine and/or amide groups. The pretreatment solution contains 0.001 to 50 wt. % of the reactant. Concentrations of 0.05 to 25 wt. % have proven suitable. Most preferred is a pretreatment solution containing 0.1 to 10 wt. % of the reactant.

In one embodiment of the invention, the reactant can be a nucleophilic reactant. It can be advantageous here if the pretreatment solution has a nucleophilicity comparable to or higher than the esterified and/or etherified alcohol or the ketone of the polymer.

The cationic modification of the polymer surface of the shaped part takes place by nucleophilic substitution on the ester and/or ether bonds or on the ketone bonds. In this process, amine, imine and/or amide groups of the reactant are chemically bonded to the surface of the shaped part.

The modification or functionalization of the surface of the shaped part is catalyzed by acid or base depending on the reactant used. In principle, however, it can also be carried out in the neutral pH range. However, under neutral conditions, the reaction rate can be significantly reduced, the selectivity of the reaction can be impaired, and the degree of functionalization can be reduced. It is therefore advantageous to carry out the modification or functionalization outside the neutral range at defined pH values. pH values between 7.5 and 14, in particular between 9 and 12, have proven to be advantageous here. For some reactant-plastic combinations, it can be advantageous to carry out the functionalization alternatively under acidic pH values in the range from 2 to 6.5.

A constant pH value of the pretreatment solution can be ensured by using a buffer.

In general, a large number of reactants can be used for the modification or functionalization. They need only have one or more amine, imine or amide groups and a comparable or higher nucleophilicity than the esterified and/or etherified alcohol or ketone of the polymer to ensure effective (nucleophilic) substitution at the ester, ketone or ether bond. This includes a large number of (poly)amines, poly(imines) and alcohols, but also ammonia, for example. Amides and aminated silanes are also suitable.

In one embodiment of the invention, a pretreatment solution consisting of a solvent, a pH buffer and a nucleophilic reactant is produced for the pretreatment. The use of the pH buffer is only optional, however. A catalyst can also optionally be added. Possible catalysts are nickel, platinum, cobalt or copper catalysts. They can be present as a metal, salt or oxide. They are optionally applied to porous carrier materials, e.g. $Al_2O_3$ or $SiO_2$. Acids and bases can also act as catalysts for the functionalization.

The shaped part is completely dipped in the pretreatment solution for between 1 minute and 300 minutes. It is important here that the shaped part (or at least those portions of the surface of the shaped part which are subsequently to be dyed) is completely surrounded by the pretreatment solution. In this case, the shaped part can be immersed in the pretreatment solution. Thorough mixing can be ensured by rotating the container or stirring the pretreatment solution. If the density of the shaped part is lower than the density of the pretreatment solution, the shaped part can be held in the pretreatment solution using aids.

The pretreatment of the surface of the shaped part according to the method described herein results in an ionic bond between dyes having anionic binding sites, mostly acid groups, and the shaped part during a subsequent dyeing step. As a result, the dye is chemically bonded to the polymer chains and thus fixed much better to the surface of the shaped part.

When modification or functionalization of the surface of the shaped part is referenced here in connection with the pretreatment, the term "surface" refers to the uppermost or outermost layer of the shaped part that is modified or functionalized. This means that, when modifying or functionalizing the surface of the shaped part, the pretreatment solution penetrates into the material of the shaped part up to a certain depth.

Measurements have shown that the pretreatment solution penetrates up to 300 μm into the material of the shaped part, so that the material is cationically modified or functionalized up to this penetration depth.

In one embodiment, the pretreatment or the pretreatment step can also be carried out at positive pressure or above atmospheric pressure. Penetration depths of the pretreatment solution of more than 300 μm can also be achieved in this case.

In one embodiment of the invention, the pretreatment step is carried out at room temperature (15° C. to 25° C.), i.e. the temperature of the pretreatment solution in the pretreatment step is approximately room temperature.

In an alternative embodiment of the invention, the pretreatment step can also be carried out above room temperature, in particular up to a temperature of 130° C.

Carrying out the pretreatment step at room temperature is advantageous in that it is technically particularly easy to implement, since no heating equipment is required and possible distortion of the shaped parts due to a rise in temperature is ruled out.

On the other hand, carrying out the pretreatment step above room temperature is advantageous in that the cationic modification or functionalization of the surface can be carried out more quickly due to the higher reactivity and, in addition, greater penetration depths of the pretreatment solution into the surface of the shaped part can also be achieved. It is advantageous here if the shaped part is placed in the pretreatment solution at room temperature and the pretreatment solution is then heated. The heating rates for heating the pretreatment solution must be selected in such a way as to minimize or keep as low as possible any thermal stress to which the shaped part can be exposed during heating and which can change the material properties of the shaped part and can lead to thermal distortion or a change in geometry of the shaped part. Heating rates up to 9° C./min have proven advantageous. If the pretreatment solution is heated to a temperature above 100° C. or above the boiling point of the pretreatment solution, it is advantageous to carry out the pretreatment step in a pressure-tight container.

The result of the pretreatment step is a shaped part that was printed in a 3D printing process with a plastic having ester, ketone and/or ether bonds and of which the surface is cationically modified or functionalized.

It has been shown that a shaped part pretreated in this way can be dyed in particular with acid dyes, metal complex dyes or mixtures thereof, since these dyes can chemically bind directly to the modified surface of the shaped part. In addition, these dyes are sterically blocked in the matrix due to their size. Very good wash fastness and color fastness and very low dye migration are thus achieved for these dyes. In addition, acid and metal complex dyes, which are also functionalized with acid groups, allow the widest possible range of colors when dyeing the shaped parts.

Example of a Pretreatment Step

A methacrylate-based shaped part that was printed using a stereolithography process is placed in an aqueous diamine solution (pretreatment solution) at approximately 20° C. for a period of approximately 120 minutes. The solution contains approximately 2 vol. % hexamethylenediamine. Furthermore, the pretreatment solution is stabilized at pH=11 with glycine, caustic soda and/or sodium chloride.

First Drying Step

After the pretreatment step, the shaped part can be cleaned with water, preferably partially or fully demineralized or distilled water, or a suitable cleaning solution and dried in a first drying step TS1 before being fed to the dyeing step. The first drying step is optional, however, and so the shaped part can also be fed directly to the dyeing step after pretreatment. Cleaning is also optional.

Alternative cleaning agents or cleaning solutions are alcohols, e.g. ethanol, methanol, (aqueous) phosphate solutions, (aqueous) silicate solutions and (aqueous) surfactant solutions.

The shaped part can be dried at room temperature and ambient pressure. Alternatively, the shaped part can also be dried at higher temperatures, for example at temperatures between 25° C. and 75° C. and/or under negative pressure or under vacuum, in order to accelerate the drying process.

Dyeing Step

After the pretreatment step VS and optionally after the optional first drying step TS1, the pretreated shaped part is dyed.

It is particularly advantageous here if acid dyes, metal complex dyes or mixtures thereof are used as dyes, since shaped parts that have been pretreated according to the methods described herein achieve a high-quality, homogeneously dyed surface that is also color fast and wash fast and exhibits very low dye migration.

In the dyeing step, the shaped part is placed for a predetermined dyeing time in a dyeing solution which comprises at least a second solvent and a dye which is dissolved in the second solvent, such as acid dyes, metal complex dyes or mixtures thereof. Based on the overall composition of the dyeing solution, the dyeing solution contains 0.0001 to 10 wt. %, preferably 0.0001 to 1 wt. % of the dye.

It is advantageous if the dyeing solution is buffered to a predetermined pH value, which is preferably between 2.5 and 7, more preferably between 3.5 and 6, particularly preferably between 4 and 5.

Acetic acid and an acetic acid/acetate buffer, for example, can be used as the acid and acid buffer, respectively. An alternative acid is formic acid, for example. Alternative buffers are, for example, buffers consisting of citric acid/NaCl/NaOH, buffers consisting of citric acid/sodium citronate, buffers consisting of potassium hydrogen phthalate/NaOH, or a buffer consisting of formic acid/sodium formate.

Furthermore, it can be advantageous if a leveling agent and/or a defoamer are added to the dyeing solution. Ethoxylates and esters of e.g. fatty acids, alcohols or alkylamines have been found to be suitable as leveling agents. Ethoxylates, e.g. of alcohols or esters, e.g. phosphoric acid isonyl esters, polysiloxanes, mineral oils and mixtures thereof are suitable as defoamers.

In combination with the pretreatment step in which the surface of the shaped part having ester, ketone and/or ether bonds is cationically modified or functionalized, dyeing of the shaped part can be achieved which is characterized on the one hand by very low migration of the dye, since the dye is chemically bonded to the polymer chains of the shaped part. On the other hand, it has surprisingly been found that the use of the acid or acid buffer in the dyeing solution on the one hand supports the penetration of the inherently migration-inert dye into the surface of the shaped part, so that after the dyeing step the material on the surface of the shaped part is thoroughly dyed to a certain penetration depth, and on the other hand enhanced dyeing is achieved.

Figure 2:
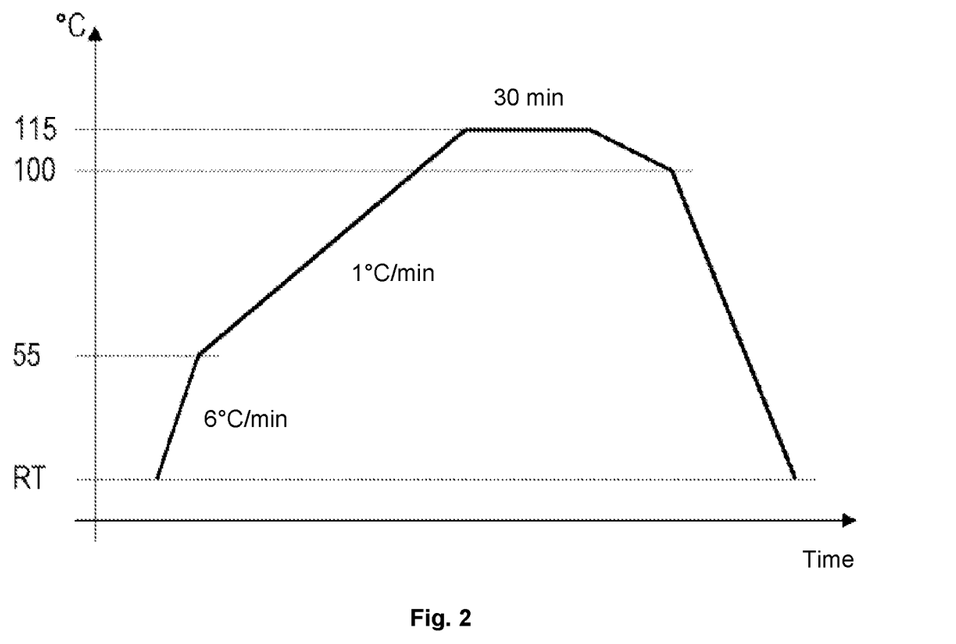
FIG. 2 shows an exemplary temperature curve during the dyeing step.

FIG. 2 shows an exemplary temperature curve during the dyeing step.

The shaped part to be dyed is placed in the dyeing solution, which is at approximately room temperature RT (15° C. to 25° C.). Then, the dyeing solution together with the shaped part contained therein is heated to a temperature (dyeing temperature) between 30° C. and 180° C., preferably between 70° C. and 130° C., for between approximately 5 minutes and 500 minutes, preferably for between approximately 10 minutes and 200 minutes. In the temperature curve shown in FIG. 2, the dyeing solution is heated to a temperature of approximately 115° C. This temperature is maintained for 30 minutes.

Alternatively, the shaped part can also be placed in the dyeing solution heated to a temperature between 50° C. and 180° C., preferably between 70° C. and 130° C. However, it has been found that the shaped part can be exposed to considerable thermal stress due to the temperature difference between the shaped part and the dyeing solution, which stress can change the material properties of the shaped part and can lead, for example, to thermal distortion or to a change in the geometry of the shaped part (or loss of mechanical properties, e.g. restoring force), which may not be desired.

In one embodiment of the invention, it can be advantageous to carry out the dyeing in a pressure-tight container in order to ensure that the shaped part lies completely in the dyeing solution even at high dyeing temperatures. In addition, the dyeing can then be carried out under positive pressure, which has a positive effect on the color absorption by the shaped part.

As used herein, "dyeing the surface of the shaped part" means that a top or outermost layer of the shaped part is dyed. This means that when the surface of the shaped part is dyed, the dye penetrates into the material of the shaped part up to a certain depth.

Experiments have shown that penetration depths of the dye into the surface of the shaped part of up to 300 μm or more can be achieved. This means that the dye penetrates into the material of the shaped part. This is advantageous in that, even with portions of the surface of the shaped part that have been exposed to high amounts of mechanical stress, the original color of the material (with which the shaped part was printed) of the shaped part is not exposed (or is at least only exposed very late).

According to one embodiment of the invention, the dyeing solution is heated at a first heating rate to a first temperature and at a second heating rate from the first temperature to the dyeing temperature.

Experiments have shown that the first heating rate is advantageously between 3° C./min and 9° C./min and the second heating rate is between 0.5° C./min and 3° C./min. The first temperature can be between 40° C. and 70° C. As a result, the thermal stress to which the shaped part is exposed during heating can be minimized.

In the example shown in FIG. 2, the dyeing solution is first heated from room temperature RT to the first temperature of approximately 55° C. at a heating rate of 6° C./min and then to the dyeing temperature of approximately 115° C. at a heating rate of 1° C./min. The dyeing temperature of approximately 115° C. is then kept largely constant for approximately 30 minutes.

In an alternative embodiment of the invention, the dyeing solution can also be heated from room temperature to the dyeing temperature at a constant heating rate, which is then preferably between 1° C./min and 6° C./min.

After the dyeing time has been reached, the dyeing solution is cooled again to a temperature below 40° C., for example to room temperature. Here, care should be taken to ensure that the cooling rates are not too high in order to minimize thermal stress to which the shaped part is exposed during cooling. Cooling rates below 5° C./min, preferably below 3° C./min, have proven to be particularly favorable here. Alternatively, the shaped part can also be removed from the hot (in the case of water below 100° C.) solution, or the hot solution can be drained or suctioned off.

With the pretreatment step and the subsequent dyeing step, a dyed shaped part made from a polymer having ester, ketone and/or ether bonds is provided which has an extremely homogeneously dyed surface and is characterized by high migration resistance of the dye. Due to the achieved penetration depth of the dye into the surface of the shaped part, the color is prevented from flaking off and therefore the color of the shaped part is retained even when said part is subjected to mechanical stress.

Shaped parts which are made from a polymer having ester, ketone and/or ether bonds and are produced in a 3D printing process can be dyed homogeneously in any color, in particular using acid dyes, metal complex dyes and mixtures thereof, without having to modify the 3D printing process. The method can also be used without changes for dyeing all polymers having ester, ketone and/or ether bonds.

Second Drying Step

After the dyeing step, the dyed shaped part can be cleaned with water, preferably partially or fully demineralized or distilled water, or a suitable cleaning solution and optionally dried in a second drying step TS2.

The alternative cleaning solutions mentioned in relation to the first drying step can also be used for cleaning.

The shaped part can be dried in the second drying step at room temperature and ambient pressure. Alternatively, the shaped part can also be dried at higher temperatures, for example at temperatures between 25° C. and 75° C. and/or under negative pressure or under vacuum, in order to accelerate the drying process.

Example 1

(Pretreatment step) A white-methacrylate-based shaped part printed in the SLA process was placed for two hours in an aqueous pretreatment solution which had a temperature of approximately 20° C., was adjusted to pH=11 and contained 5% hexamethylene diamine as a reactant.

(First drying step) The shaped part was then rinsed with distilled water and dried in a forced-air oven at approximately 40° C.

(Dyeing step) After drying, the shaped part was placed in an aqueous dyeing solution having a temperature of approximately 20° C. The dyeing solution was produced from 0.1 wt. % of the dye C.I. Acid Red 131 and 0.1 wt. % of acetic acid/acetate buffer, with which the dyeing solution was buffered at pH=4.5. The dyeing solution was heated to approximately 115° C. with the shaped part placed therein, the dyeing solution being heated at 6° C./min to 55° C. and then at 1° C./min to 115° C. The dyeing temperature of 115° C. was maintained for approximately 30 minutes before being cooled to approximately 20° C. at approximately 1° C./min.

(Second drying step) Finally, the shaped part was taken out of the dyeing solution and dried at approximately 20° C.

Example 2

(Pretreatment step) A transparent acrylate-based shaped part printed in the SLA process was placed for one hour in an aqueous pretreatment solution which had a temperature of approximately 20° C., was adjusted to pH=11 and contained 2% hexamethylene diamine as a reactant.

(First drying step) Subsequently, the shaped part was dried at approximately 20° C.

(Dyeing step) After drying, the shaped part was placed in an aqueous dyeing solution having a temperature of approximately 20° C. The dyeing solution was produced from 0.1 wt. % of the dye C.I. Acid Red 131 and 0.1 wt. % of acetic acid/acetate buffer, with which the dyeing solution was buffered at pH=4.5. The dyeing solution was heated to approximately 115° C. with the shaped part placed therein, the dyeing solution being heated at 6° C./min to 55° C. and then at 1° C./min to 115° C. The dyeing temperature of 115° C. was maintained for approximately 15 minutes before being cooled to approximately 20° C. at approximately 1° C./min.

(Second drying step) Finally, the shaped part was taken out of the dyeing solution, rinsed with distilled water and dried at approximately 20° C.

Example 3

(Pretreatment step) A polyester-based shaped part printed in the selective laser sindtering (SLS) process was placed for two hours in an aqueous pretreatment solution which had a temperature of approximately 20° C., was adjusted to pH=11 and contained 5% hexamethylene diamine as a reactant.

(First drying step) The shaped part was then rinsed with deionized water and dried under vacuum at approximately 20° C.

(Dyeing step) After drying, the shaped part was placed in an aqueous dyeing solution having a temperature of approximately 20° C. The dyeing solution was produced from 0.1 wt. % of the dye C.I. Acid Blue 225, 0.01 wt. % of the dye C.I. Acid Blue 193 and 0.1 wt. % of acetic acid/acetate buffer, with which the dyeing solution was buffered at pH=4.5. The dyeing solution was heated to approximately 115° C. with the shaped part placed therein, the dyeing solution being heated at 6° C./min to 55° C. and then at 1° C./min to 115° C. The dyeing temperature of 115° C. was maintained for approximately 30 minutes before being cooled to approximately 20° C. at approximately 1° C./min.

(Second drying step) Finally, the shaped part was taken out of the dyeing solution and dried at approximately 20° C.

Examples are described above in which water was used as a solvent. However, other solvents can also be used, in particular polar, preferably protic solvents such as ethanol and other alcohols, formamide and/or ammonia.

What is claimed is:

1. A method for treating the surface of a shaped part produced in a 3D printing process with a plastic having ester, ketone and/or ether bonds, the plastic being selected from the group comprising a polymer, copolymer, polymer blend and combinations thereof, the method comprising a pretreatment step (VS) for cationically modifying the surface of the shaped part, with cationic modification meaning the binding of functional groups, wherein, in the pretreatment step, the shaped part is placed in a pretreatment solution for a predetermined pretreatment time, the pretreatment solution comprising at least:

a first solvent and a reactant which is dissolved in the first solvent and has one or more amine, imine and/or amide groups, wherein the shaped part is 3D printed, and wherein the pretreatment solution is buffered to a predetermined pH value, the predetermined pH value being between 7 and 14.

2. The method of claim 1, wherein the first solvent comprises water.

3. The method of claim 1, wherein the reactant is a nucleophilic reactant and wherein the pretreatment solution has a nucleophilicity comparable to or higher than the esterified and/or etherified alcohol of the plastic or the ketone.

4. The method of claim 1, wherein the pretreatment time is between 1 minute and 300 minutes.

5. The method of claim 1, wherein the pretreatment solution in the pretreatment step has a temperature between 10° C. and 130° C.

6. The method of claim 1, wherein the pretreatment step is carried out above atmospheric pressure.

7. The method of claim 1, wherein the surface treatment includes a dyeing step for dyeing the surface of the shaped part, which is carried out after the pretreatment step.

8. A method for dyeing a shaped part produced in a 3D printing process with a plastic having ester, ketone and/or ether bonds, the plastic being selected from the group comprising a polymer, copolymer, polymer blend and combinations thereof, the method comprising a pretreatment step (VS) for cationically modifying the surface of the shaped part, with cationic modification meaning the binding of functional groups, and a dyeing step (FS), carried out after the pretreatment step, for dyeing the surface of the shaped part wherein in the pretreatment step, the molded part is placed in a pretreatment solution for a predetermined pretreatment time, the pretreatment solution comprising at least:

a first solvent and a reactant which is dissolved in the first solvent and has one or more amine, imine and/or amide groups, wherein the shaped part is 3D printed, and wherein the pretreatment solution is buffered to a predetermined pH value, the predetermined pH value being between 7 and 14, and in the dyeing step, the shaped part is placed in a dyeing solution for a predetermined dyeing time, the dyeing solution comprising at least a second solvent and a dye dissolved in the second solvent.

9. The method of claim 8, wherein the first solvent comprises water.

10. The method of claim 8, wherein the reactant is a nucleophilic reactant and wherein the pretreatment solution has a nucleophilicity comparable to or higher than the esterified and/or etherified alcohol of the plastic or the ketone.

11. The method of claim 8, wherein the pretreatment time is between 1 minute and 300 minutes.

12. The method of claim 8, wherein the pretreatment solution in the pretreatment step has a temperature between 10° C. and 130° C.

13. The method of claim 8, wherein the pretreatment step is carried out above atmospheric pressure.

14. The method of claim 8, wherein the pretreatment solution contains 0.001 to 50 wt. % of the reactant.

15. The method of claim 8, wherein the dye is selected from the group comprising acid dye, metal complex dye, and mixtures thereof.

16. The method of claim 8, wherein the dyeing solution is buffered to a predetermined pH.

17. The method of claim 8, wherein the dyeing solution contains a leveling agent and/or a defoamer.

18. The method of claim 8, wherein the dyeing solution contains 0.0001 to 10 wt. % of the dye.

19. Method according to claim 8, wherein the dyeing step is carried out in a pressure-tight container.

20. The method of claim 8, wherein, in the dyeing step, the dyeing solution is heated to a dyeing temperature between 30° C. and 180° C.

21. The method of claim 20, wherein the dyeing solution is heated at a first heating rate to a first temperature and at a second heating rate from the first temperature to the dyeing temperature.

22. The method of claim 21, wherein the first heating rate is between 3° C./min and 9° C./min and/or wherein the second heating rate is between 0.5° C./min and 3° C./min.

23. The method of claim 21, wherein the first temperature is between 40° C. and 70° C.

24. The method of claim 20, wherein the dyeing temperature is kept largely constant for a period of between 5 minutes and 200 minutes.

25. The method of claim 24, wherein the dyeing solution is subsequently cooled to a temperature below 40° C., the cooling rate being below 5° C./min.

26. The method of claim 8, wherein the dyeing step is carried out under positive pressure.

27. The method of claim 7, wherein the shaped part, after the pretreatment step and before the dyeing step, is cleaned and/or is dried.

28. The method of claim 27, wherein the drying is carried out above room temperature and/or under negative pressure.

29. The method of claim 8, wherein the reactant is selected from the group comprising ammonia amines, imines, aminosilanes, amides, aminated alcohols, and combinations thereof.

30. The method of claim 1 further comprising 3D printing the shaped part prior to the pretreatment step.

31. The method of claim 8 further comprising 3D printing the shaped part prior to the pretreatment step.

* * * * *

UNITED STATES PATENT AND TRADEMARK OFFICE
CERTIFICATE OF CORRECTION

PATENT NO. : 12,151,435 B2  
APPLICATION NO. : 17/893627  
DATED : November 26, 2024  
INVENTOR(S) : Alena Folger Page 1 of 1

It is certified that error appears in the above-identified patent and that said Letters Patent is hereby corrected as shown below:

On the Title Page

In Column 1, Item (30) foreign application priority data should read as Feb. 27, 2020 (DE) ..................... 10 2020 105 232.4

Signed and Sealed this
Twenty-fifth Day of February, 2025

Coke Morgan Stewart
*Acting Director of the United States Patent and Trademark Office*